Dec. 13, 1955   E. R. WILLIAMS   2,726,729
HORIZONTAL OIL AND GAS SEPARATOR AND EMULSION TREATER
Filed Jan. 12, 1953   2 Sheets-Sheet 1
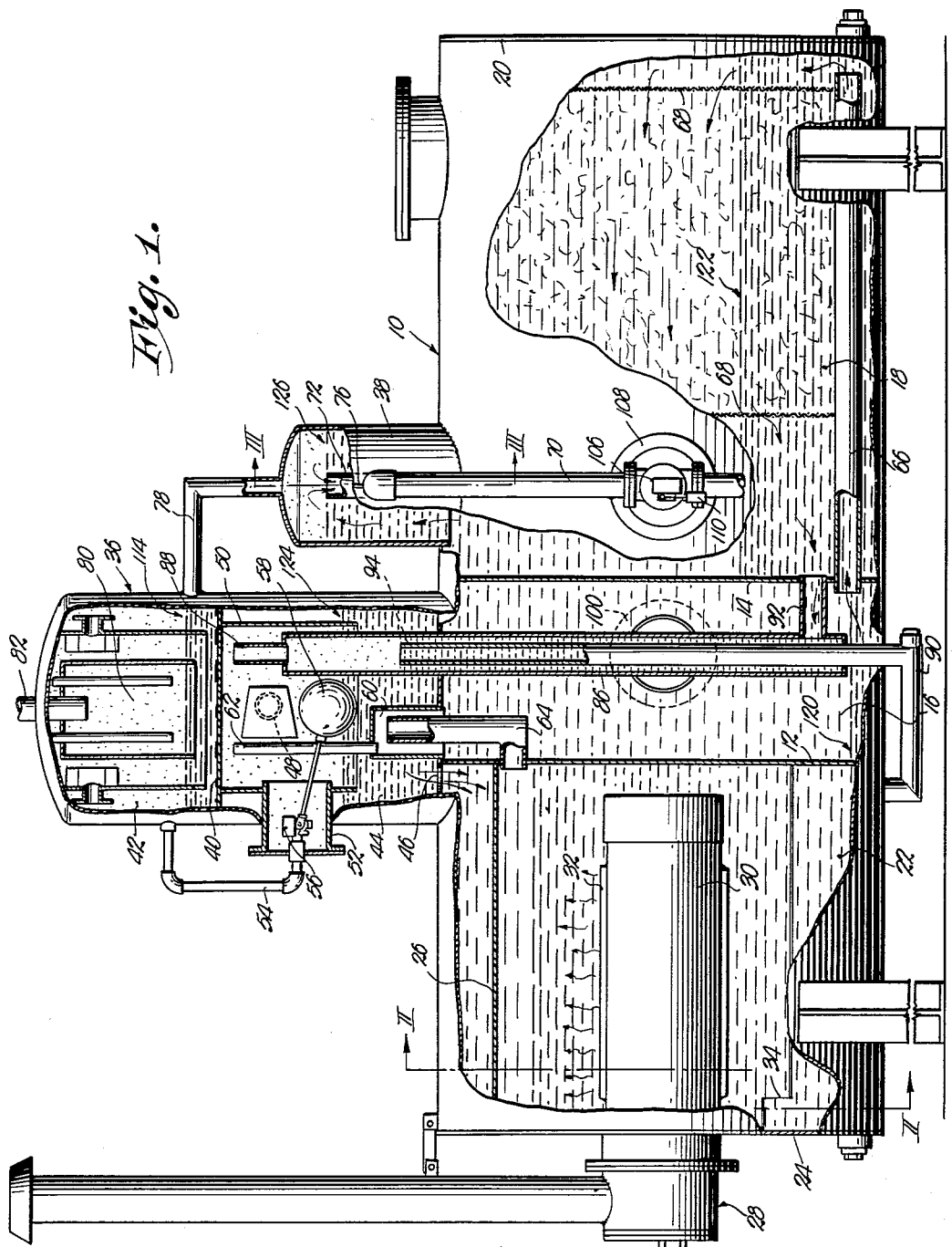
INVENTOR.
Elmer R. Williams
BY
ATTORNEY.

Dec. 13, 1955  E. R. WILLIAMS  2,726,729
HORIZONTAL OIL AND GAS SEPARATOR AND EMULSION TREATER
Filed Jan. 12, 1953  2 Sheets-Sheet 2
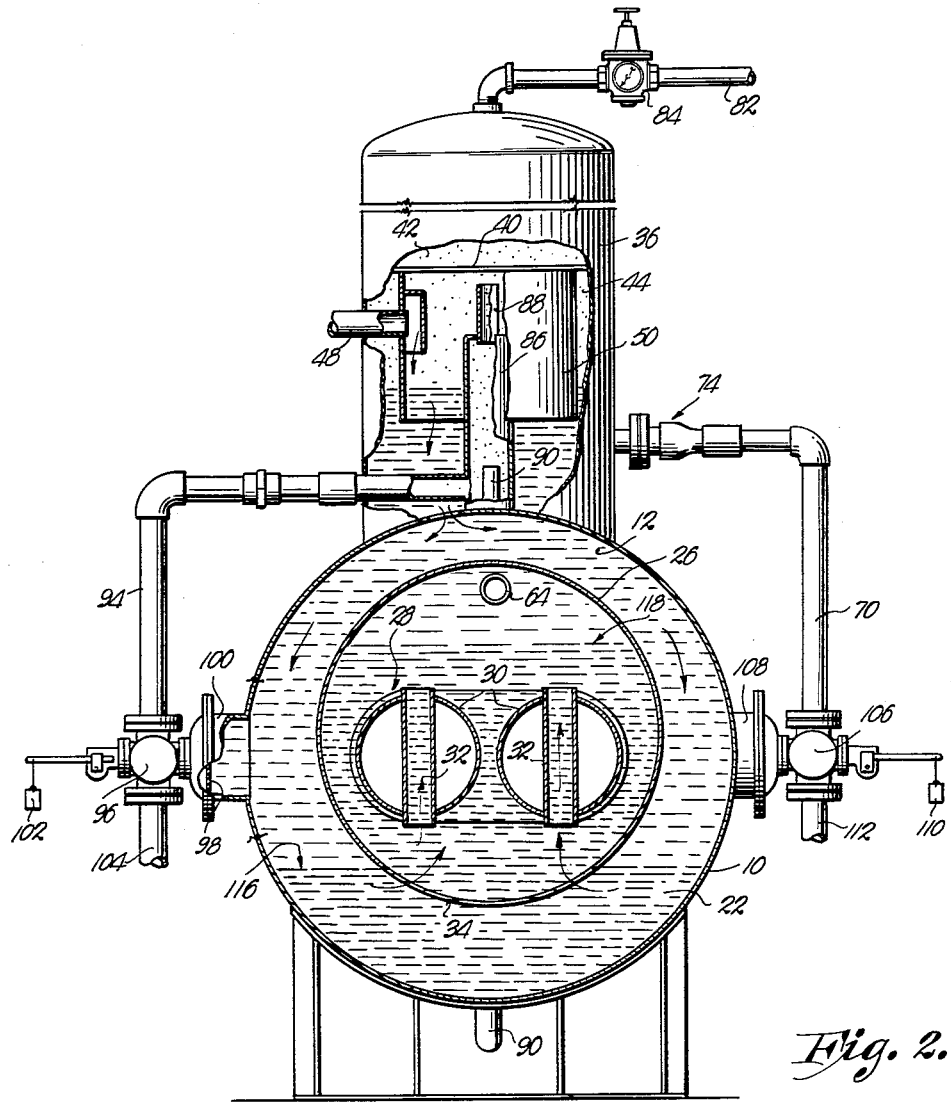
INVENTOR.
Elmer R. Williams
BY
ATTORNEY.

United States Patent Office 2,726,729
Patented Dec. 13, 1955

2,726,729

HORIZONTAL OIL AND GAS SEPARATOR AND EMULSION TREATER

Elmer R. Williams, Great Bend, Kans.

Application January 12, 1953, Serial No. 330,723

7 Claims. (Cl. 183—2.7)

This invention relates to structure for handling petroleum products which normally contain oil, water and gas, either as the same emanate directly from the oil well or from a point of storage, such structure including means for separating the gas from the products, together with a treater for removing water therefrom and directing clean oil to stock tanks or other points of storage or use.

It is quite conventional in this field to provide treaters and other equipment taking the form of elongated, upright, cylindrical drums that extend to various heights. The industry today however, is becoming reluctant to purchase upstanding equipment and are demanding treaters and the like that are disposed horizontally, and therefore, relatively close to the ground. It is manifest that whenever such equipment is extended in a horizontal direction, tremendous redesign is necessary if the natural laws of gravity and differing densities of the component parts of the products are to be used advantageously for the purpose of establishing a through-flow without the necessity of power-driven equipment such as pumps and the like.

It is accordingly, the most important object of the present invention to provide a horizontal oil and gas separator and emulsion treater for the purpose of taking advantage of the ease with which such type of equipment can be produced, installed and maintained and to therefore, meet the demand of the industry as above set forth.

It is the important object of this invention to provide a horizontal treater employing a dual pressure system to the end that the natural build-up of gas pressure in one section of the treater may be utilized to not only force the fluid through the treater, but to convey the clean oil therefrom to a point of storage even if such clean oil must be elevated from the treater to storage tanks therefor.

Another object of the instant invention is to provide a novel arrangement in equipment of this type wherein a differential in pressures is maintained in differing sections of the treater so as to automatically provide the necessary force for moving the finished oil from the treater to a point of storage.

Another important object of this invention is to provide in a treater of the horizontal type, a pressure regulator within the gas outlet, so arranged as to establish the aforesaid differential in pressures in the two pressure system of the present invention.

A still further object of this invention is to provide a separator having a pair of sections, one of which communicates with the horizontal drum and receives the petroleum products to be treated, the other section being provided with a mist extractor, both sections being provided with means for maintaining a predetermined pressure, the pressure of the mist extractor section being equalized with one portion of the drum and the pressure of the other section being equalized with all of the remaining parts of the horizontal drum.

A further object is to provide a treater wherein the pressure of the incoming products is utilized advantageously to maintain a predetermined differential in pressures in two sections of the treater.

A still further object hereof is to provide structure of the aforementioned type wherein the draining of water from the treater, as well as the out-flow of clean oil, are controlled by pressure valves acted upon on the one hand by pressure within the horizontal drum, and on the other hand by the heads of water and oil respectively, to the end that the separated gas, water and oil flow from the system automatically at rates depending upon the rate of in-flow of the petroleum products and the relative percentages of gas, water and oil in the material being treated.

Other objects include many important details of construction such as the way in which the settled water from the products is siphoned from the system; the manner of providing means for adjusting pressure differentials; the way in which the horizontal drum is compartmented to present a heat chamber and a pair of settling sections; and the way in which the fluid flow from one compartment to another is controlled through the novel construction hereinafter set forth in full.

In the drawings:

Figure 1 is a fragmentary, side elevational view of a horizontal oil and gas separator and emulsion treater, made pursuant to my present invention, parts being broken away and in section to reveal details of construction.

Fig. 2 is a vertical, cross-sectional view taken on line II—II of Fig. 1, parts being broken away for clearness; and Fig. 3 is a fragmentary, detailed, cross-sectional view taken on line III—III of Fig. 1.

As is clear in the drawings, the structure forming the subject matter of the present invention includes an elongated, preferably cylindrical, drum 10, having a horizontal, longitudinal axis. As will hereinafter appear, there is more involved in lowering the over-all height of equipment of this kind than merely tipping the drum on its side. The expense and other disadvantages of power equipment would not justify such alteration of position, and it is, therefore, essential that a system be provided to utilize gravitational flow and the natural pressure of the products themselves to attain the flow through the treater comparable to that of upright drums.

Accordingly, the drum 10 is provided with a pair of spaced, vertical partitions 12 and 14, presenting a first settling section or compartment 16 therebetween, a second settling section or compartment 18 between partition 14 and one end wall 20, and a heat chamber 22 between the partition 12 and the opposite end wall 24 of drum 10.

The chamber 22 is further sub-divided by a container 26 therein for a furnace 28 that extends thereinto through the end wall 24. Furnace 28 is mounted in the container 26 in any suitable manner, and consists of a pair of side-by-side, horizontal, tubular combustion chambers 30, as shown in Fig. 2, each of which is traversed by an elongated, vertical shell 32, open at its top and bottom. The container 26, which is centrally disposed within the chamber 22, is cut away at one end thereof as at 34 to place the same into communication with the chamber 22.

Drum 10 supports an upright tank-like separator broadly designated by the numeral 36, together with a smaller tank 38 alongside the separator 36. The separator tank 36 is provided with a horizontal partition 40 presenting an upper section 42 and a lower section 44. An opening 46 in the drum 10 at the top thereof, places the lower section 44 of separator 36 into communication with the chamber 22.

Petroleum products to be treated are directed into the lower section 44 under pressure either directly from the well or from a point of storage not herein shown, by means of a pipe 48 that extends into an open bottom, preferably cylindrical skirt 50 depending from the partition 40 and terminating above the drum 10. A gas outlet 52 also communicating with the skirt 50 has a gas outlet pipe 54 that communicates with the upper section 42 of separator 36.

A control valve 56 in the pipe 54 is operated in response to movement of a float 58 operably connected with the valve 56, float 58 being within the skirt 50 as shown in Fig. 1. A short gas collecting tube 60 within the section 44, carried by the drum 10, communicates at its lowermost end with the first settling compartment 16, and is placed into communication with the section 44 by an upstanding pipe 62 terminating just below the partition 40. An L-shaped fluid flow pipe 64 carried by the partition 12 extends upwardly into the tube 60 and places the chamber 22 into communication with the compartment 16.

The compartments 16 and 18 are interconnected by an elongated pipe 66 within the compartment 18 and extending along the bottom of the latter through the partition 14, one end of the pipe 66 terminating adjacent the end wall 20 of drum 10. If desired, a suitable filter medium such as excelsior, may be confined within the compartment 18 between a pair of spaced, perforated or foraminous, vertical baffles 68 in the compartment 18.

Tank 38 is in full communication with the compartment 18 as shown in Figs. 1 and 3, and with an oil outlet pipe 70 exteriorly of the drum 10. Pipe 70 has an L-shaped section 72 that extends into the tank 38 and is rotatable within a suitable coupling 74 in the pipe 70. The vertical leg of the section 72 may therefore, be swung to selected positions by means of a handle 76 for purposes hereinafter to be made clear. Tank 38 also communicates with the upper section 42 of separator 36 just above the partition 40 by means of an L-shaped pipe 78. The section 42 of separator 36 is provided with a mist extractor 80 that may be of conventional construction and which communicates with a gas outlet pipe 82 having a pressure regulator 84 therein exteriorly of the separator 36, as shown in Fig. 2.

The water siphoning system hereof includes a vertical tube 86 within the compartment 16 of drum 10. Tube 86 is closed at its lowermost end, extends upwardly through the drum 10 into the lower section 44 of separator 36, and terminates in an open top pipe 88 within the skirt 50 just below the partition 40. A substantially J-shaped tube 90 communicates with the chamber 22, extends upwardly into the compartment 16 of drum 10 and thence upwardly into the tube 86, terminating in an uppermost open end just above drum 10 as shown in Figs. 1 and 2. Tube 86 communicates at its lowermost end with the compartment 18 by means of a connecting pipe 92 extending through the partition 14 adjacent the pipe 66.

A water outlet pipe 94 exteriorly of the drum 10, joins with the tube 86 just below the upper most end of tube 90 as shown in Figs. 1 and 2, and projects outwardly through the section 44 and the side wall of separator 36.

A control valve 96 within the water pipe 94, is operably coupled with a flexible diaphragm 98 (Fig. 2) that is in turn disposed within a hollow housing 100 communicating with the first settling compartment 16 of drum 10. The pressure within the compartment 16 acting upon the diaphragm 98, tends to close the valve 96, whereas, a weight 102 operably connected with the valve 96, together with the head of water in pipe 94, tend to move the valve 96 to an open position. A conduit 104 coupled with the valve 96 receives the salt water and conveys the same to the usual salt pits or other drain.

The oil pipe 70 is provided with a valve 106 similar to the valve 96 and controlled by a diaphragm not shown, within a housing 108 that communicates directly with the compartment 18 of drum 10. Here again, valve 106 is moved toward the open position by the combination of the head of oil in pipe 70 and by a weight 110 operably connected with the valve 106. It is, of course, understood that the amount of weight 102 or 110 may be varied so as to adjust the valves 96 and 106 respectively. A tube 112 communicating with the valve 106 conveys the clean oil to a point of use or storage such as the usual stock tanks which may be elevated if desired, since the present structure supplies sufficient pressure for such overhead conveyance of the finished oil as will become clear when the operation is hereinafter explained in detail.

In operation, the petroleum products containing gas, water and oil are initially directed into the skirt 50, through pipe 48. The rate of delivery of petroleum products to pipe 48 varies with changes in field operating conditions. Such products will immediately gravitate from the section 44 into the chamber 22, through the opening 46, and thence into the container 26 by way of opening 34. The flow, as indicated by the arrows in Fig. 2, is then upwardly through the shells 32 of furnace 28, and thereupon through pipe 64 from container 26 into the first settling compartment 16. The flow from compartment 16 to compartment 18, is by way of pipe 66 and the clean oil ultimately flows from the tank 38 through the pipe 70, past valve 106 when the latter is open, and into the conduit 112.

As the products enter the skirt 50 in separator 36, free gas will immediately separate therefrom and collect within the separator 36 immediately below the partition 40. Thus, the build-up of pressure within section 44 tends to lower the level of products therein as clean oil and water leave drum 10 under pressure. When the float 58 falls, valve 56 is open, and these gases thereupon pass into the section 42 by way of pipe 54 until the liquid level in section 44 rises sufficiently to close valve 56. In this manner, the maintenance of pressure in section 44 forces oil and water from the drum 10 at a rate to keep the liquid in section 44 at a predetermined level as long as the petroleum products are entering through pipe 48. The mist extractor 80 will remove oil and gasoline from the loose ends and such extraction will assume a level 114 above partition 40 and flow into the tank 38. The dry gas escapes from the section 42 of separator 36 by way of pipe 82 as determined by the setting of pressure regulator 84. It is therefore, to be noted that by virtue of the equalizer pipe 78, the pressure in separator section 42 and in tank 38 will be the same.

The second pressure system i. e. the pressure in section 44 of the separator 36, is also equalized in the chamber 22 and compartment 16. In this respect it is noted that the gas pressure below partition 40 is directed to the compartment 16 by way of pipe 62 and tube 60 and that this same pressure is directed to the siphoning system by virtue of the pipe 88, placing the tube 86 into communication with the section 44 immediately below partition 40.

It is to be noted that the cold petroleum products are pre-heated as they enter the chamber 22 by virtue of the direct contact with the outside of container 26 in the downward movement toward the opening 34 as indicated by the arrows in Fig. 2. Much of the free water content of the products will immediately settle within the chamber 22. As the products rise within the container 26 and wash along the tubes 30, as well as through the shells 32, additional water will be knocked out of the products and settle in the container 26 and thence into the chamber 22. This water in the chamber 22 and the petroleum products in container 26 should be maintained at levels substantially as indicated by the numerals 116 and 118 respectively, to facilitate the settling of water just above set forth. The level 116 is maintained by constant siphoning of settled water from the chamber 22 through J-shaped tube 90 which conveys the settled water from chamber 22 into the tube 86.

Additional water will settle in the compartment 16 establishing a level substantially as at 120, but all of the emulsion in compartment 16 is directed into the compartment 18 by pipe 66. Water settling in compartment 18 is conveyed to the tube 86 by way of connection 92, and a water level substantially at 122, will be maintained in the compartment 18 by the automatic water siphoning system. Accordingly, all of the water drained from chamber 22 and from the compartment 18 is siphoned from the drum 10 by way of the pipe 94 connecting with tube 86. The clean oil rising in compartment 18 will flow into the section 72 of pipe 70 in the manner illustrated in Figs. 1 and 3.

Liquid levels in section 44 of separator 36 and in tank 38, are designated by the numerals 124 and 126 respectively. While the liquid level 124 will vary during continuous use of the treater hearof, it will normally be below the level 126, as indicated in Fig. 1. It is to be noted that liquid level 126 is below the inlet tube 48 communicating with the separator 36.

As the pressure in section 44 above the liquid level 124 diminishes as a result of escape of gas therefrom, past open valve 56 and into the section 42 through pipe 54, liquid level 124 will rise, thereby acting on float 58 and closing the valve 56. As valve 56 moves toward or to the closed position, gas pressure will build up within the section 44 above the liquid level 124, the latter will progressively fall, and valve 56 will progressively open. Thus, as the pressure in the section 44 increases to a point greater than necessary to cause delivery of the water and oil from the system, valve 56 will automatically open, and exhaust the greater amount of gas to the mist extractor 80. Under normal operations therefore, the oil is delivered to the pipe 70 at a higher point 126 than the normal level 124, and the pressure below the partition 40 will exceed that above partition 40. While the pressure of incoming products will tend to equalize the levels 124 and 126, the pressure differentials above and below the partition 40, is determined by a predetermined setting of the pressure regulator 84.

The two pressure system is also utilized to control the out-flow of water and oil from conduits 104 and 112 respectively. The liquid pressures within the drum 10, acting upon the two diaphragms, tend to maintain valves 96 and 106 closed, and the head of water in pipe 94, together with the pre-selected weight 102 overcomes the internal pressure within compartment 16 to open valve 96. The head of oil within pipe 70, together with the pre-selected weight 110, overcomes the internal pressure of compartment 18 to open the valve 106. Thus, as level 124 varies, and as the level of water in tube 86 rises and falls, the valve 96 will open and close to permit more or less water to flow into conduit 104. By the same token, as the level 126 varies, and as the liquid level in outlet 70 rises and falls, the valve 106 will open and close to regulate the rate of flow of oil into the conduit 112. Thus, it is the differential in pressure between sections 42 and 44 which causes delivery of clean oil into oil outlet pipe 70, whereas the pressure of the section 42 is sufficient to force the clean oil to remote points of storage, even though such point be above level 126.

It is now seen that regardless of the requirements to convey the water and oil to a point of waste and storage or use, the system may be regulated by manipulation of handle 76, adjustment of the regulator 84, or selection of weights 102 and 110, to provide continuous, automatic operation regardless of any changes in pressure of the incoming products or changes in their characteristics so far as water, gas and oil content is concerned. Valve 56 automatically opens and closes according to the pressure requirements, and according to the gas content of the incoming liquids. As the water content increases, valve 96 will progressively open to maintain the water levels 116, 118 and 122. If the water content of the petroleum products diminishes, then valve 96 will progressively close and the valve 106 will progressively open to permit delivery of the increased amount of clean oil.

It is to be noted that the furnace 28 chosen for illustration, is of the gas-fired type and therefore, the gas outlet pipe 82 may be coupled with the furnace 28 if desired to furnish fuel for furnace 28.

Having thus described the invention what is claimed as new and desired to be secured by Letters Patent is:

1. In structure for handling petroleum products containing oil, water and gas, a hollow drum having a heat chamber, a settling compartment, a passage for fluid flow from the chamber to the compartment, an inlet for said products communicating with the chamber, a valved outlet communicating with said chamber for free gas emanating from the products as the latter flow into the chamber, and an oil outlet communicating with the compartment; means connected with said gas outlet for conveying said free gas from the chamber; means connecting said compartment and said gas conveying means for equalizing the pressure in the latter and in said compartment; means for siphoning the drum of water that settles in the chamber and compartment from the products; and means controlling the valve in said gas outlet for maintaining sufficient pressure in the chamber to force oil from the compartment at a rate to keep the liquid in the chamber at a predetermined level.

2. In structure for handling petroleum products containing oil, water and gas, a hollow drum having a heat chamber, a settling compartment, a passage for fluid flow from the chamber to the compartment, an inlet for said products communicating with the chamber, a valved outlet communicating with said chamber for free gas emanating from the products as the latter flow into the chamber, and an oil outlet communicating with the compartment; means connected with said gas outlet for conveying said free gas from the chamber; means connecting said compartment and said gas conveying means for equalizing the pressure in the latter and in said compartment; means for siphoning the drum of water that settles in the chamber and compartment from the products; means controlling the valve in said gas outlet for maintaining sufficient pressure in the chamber to force oil from the compartment at a rate to keep the liquid in the chamber at a predetermined level; and pressure regulating means in said gas conveying means for maintaining a pressure differential between the chamber and the compartment.

3. In structure for handling petroleum products containing oil, water and gas, a hollow drum having a heat chamber, a settling compartment, a passage for fluid flow from the chamber to the compartment, an inlet for said products communicating with the chamber, a valved outlet communicating with said chamber for free gas emanating from the products as the latter flow into the chamber, and an oil outlet communicating with the compartment; a valved oil flow pipe coupled with said oil outlet; means connected with said gas outlet for conveying said free gas from the chamber; means connecting said compartment and said gas conveying means for equalizing the pressure in the latter and in said compartment; means for siphoning the drum of water that settles in the chamber and compartment from the products; means controlling the valve in said gas outlet for maintaining sufficient pressure in the chamber to force oil from the compartment at a rate to keep the liquid in the chamber at a predetermined level; pressure regulating means in said gas conveying means for maintaining a pressure differential between the chamber and the compartment; and means communicating with said compartment, responsive to pressure in the latter, and connected with the valve in the oil flow pipe for controlling the flow of oil through the latter.

4. In structure for handling petroleum products containing oil, water and gas, a hollow drum having a heat chamber, a first settling compartment, a passage for fluid flow from the chamber to said first compartment, a second settling compartment, a passage for fluid flow from the first compartment to the second compartment, an inlet for said products communicating with the chamber, a valved outlet communicating with said chamber for free gas emanating from the products as the latter flow into the chamber, and an oil outlet communicating with the second compartment; means connected with said gas outlet for conveying said free gas from the chamber; means connecting said compartment and said gas conveying means for equalizing the pressure in the latter and in said compartment; means including a valved water flow pipe for siphoning the drum of water that settles in the chamber and compartments from the products; means controlling the valve in said gas outlet for maintaining sufficient pressure in the chamber to force oil from the second compartment at a rate to keep the liquid in the chamber at a predetermined level; pressure regulating means in said gas conveying means for maintaining a pressure differential between the chamber and the compartment; and means communicating with said first compartment, responsive to pressure in the latter, and connected with the valve in the water flow pipe for controlling the flow of water through the latter.

5. In structure for handling petroleum products containing oil, water and gas, a hollow drum having a heat chamber, a first settling compartment, a passage for fluid flow from the chamber to said first compartment, a second settling compartment, a passage for fluid flow from the first compartment to the second compartment, an inlet for said products communicating with the chamber, a valved outlet communicating with said chamber for free gas emanating from the products as the latter flow into the chamber, and an oil outlet communicating with the second compartment; means connected with said gas outlet for conveying said free gas from the chamber; means connecting said compartment and said gas conveying means for equalizing the pressure in the latter and in said compartment; a valved oil flow pipe coupled with said oil outlet; means including a valved water flow pipe for siphoning the drum of water that settles in the chamber and compartments from the products; means controlling the valve in said gas outlet for maintaining sufficient pressure in the chamber to force oil from the second compartment at a rate to keep the liquid in the chamber at a predetermined level; pressure regulating means in said gas conveying means for maintaining a pressure differential between the chamber and the compartment; means communicating with said first compartment, responsive to pressure in the latter, and connected with the valve in the water flow pipe for controlling the flow of water through the latter; and means communicating with said second compartment, responsive to pressure in the latter, and connected with the valve in the oil flow pipe for controlling the flow of oil through the latter.

6. In structure for handling petroleum products containing oil, water and gas, a hollow drum having a heat chamber, a first settling compartment, a passage for fluid flow from the chamber to said first compartment, a second settling compartment, a passage for fluid flow from the first compartment to the second compartment, an inlet for said products communicating with the chamber, a valved outlet communicating with said chamber for free gas emanating from the products as the latter flow into the chamber, and an oil outlet communicating with the second compartment; means connected with said gas outlet for conveying said free gas from the chamber; means connecting said compartment and said gas conveying means for equalizing the pressure in the latter and in said compartment; means for siphoning the drum of water that settles in the chamber and compartments from the products, said siphoning means including a water collection tube coupled with said chamber and the second compartment and a valved water flow pipe connected with said tube; means controlling the valve in said gas outlet for maintaining sufficient pressure in the chamber to force oil from the second compartment at a rate to keep the liquid in the chamber at a predetermined level; pressure regulating means in said gas conveying means for maintaining a pressure differential between the chamber and the compartment; and means communicating with said first compartment, responsive to pressure in the latter, and connected with the valve in the water flow pipe for controlling the flow of water through the latter, said tube communicating with the chamber above the level of liquid therein whereby the pressure in the chamber and in the tube are equalized.

7. In structure for handling petroleum products containing oil, water and gas, a hollow drum; a separator tank having an upper section, a lower section, an inlet for said products communicating with said lower section, and a gas outlet communicating with said lower section, said drum having a heat chamber, a settling compartment, a passage for fluid flow from the chamber to the compartment, an oil outlet communicating with the compartment, and a water outlet communicating with the chamber and the compartment, said lower section of the tank communicating with the chamber and being disposed for flow of said products therefrom to the chamber; a mist extractor in the upper section of said tank; means connected with said gas outlet for conveying gas from the lower section to the upper section; means for conveying gas from the upper section and provided with means for maintaining a predetermined pressure in the upper section; and means connecting the upper section and the compartment for conveying liquid removed by said extractor from the upper section to the compartment and for equalizing the pressures in the upper section and said compartment.

References Cited in the file of this patent

UNITED STATES PATENTS

| | | |
|---|---|---|
| 2,179,131 | Millard | Nov. 7, 1939 |
| 2,457,959 | Walker | Jan. 4, 1949 |
| 2,528,032 | Candler et al. | Oct. 31, 1950 |
| 2,601,903 | Erwin | July 1, 1952 |
| 2,601,904 | Erwin | July 1, 1952 |
| 2,615,528 | Williams | Oct. 28, 1952 |
| 2,664,170 | Walker et al. | Dec. 29, 1953 |
| 2,681,150 | Reid | June 15, 1954 |